(12) United States Patent
Taysom et al.

(10) Patent No.: US 8,812,372 B2
(45) Date of Patent: Aug. 19, 2014

(54) METHOD OF ANONYMISING AN INTERACTION BETWEEN DEVICES

(75) Inventors: John Graham Taysom, London (GB); David Cleevely, Cambridge (GB)

(73) Assignee: Really Virtual Company Limited, London (GB)

( * ) Notice: Subject to any disclaimer, the term of this patent is extended or adjusted under 35 U.S.C. 154(b) by 1077 days.

(21) Appl. No.: 12/745,313

(22) PCT Filed: Nov. 28, 2008

(86) PCT No.: PCT/GB2008/051132
§ 371 (c)(1), (2), (4) Date: Dec. 21, 2010

(87) PCT Pub. No.: WO2009/068917
PCT Pub. Date: Jun. 4, 2009

(65) Prior Publication Data
US 2011/0276404 A1    Nov. 10, 2011

(30) Foreign Application Priority Data

Nov. 28, 2007   (GB) .................................. 0723276.2

(51) Int. Cl.
*G06Q 10/00* (2012.01)
*G06Q 30/00* (2012.01)

(52) U.S. Cl.
USPC ............. 705/26.42; 705/26.35; 726/3; 726/4; 709/229

(58) Field of Classification Search
CPC .......... G06Q 30/0255; G06Q 30/0235; G06Q 10/105; G06Q 10/103; G06Q 10/067
USPC .......... 705/7.11–7.42, 26.35, 26.42; 726/3, 4; 709/229
See application file for complete search history.

(56) References Cited

U.S. PATENT DOCUMENTS

| 7,389,541 | B2   | 6/2008 | Jia |
| 7,693,283 | B2 * | 4/2010 | Livesay ........................ 380/255 |

(Continued)

FOREIGN PATENT DOCUMENTS

| EP | 1429515 A1 | 6/2004 |
| GB | 0723276.2  | 3/2008 |

(Continued)

OTHER PUBLICATIONS

A Susarla, B Andrew, P2P networking: An information-sharing alternative, Jul. 2001, 0018-9162/01/$10.00 © 2001 IEEE, pp. 31-38 http://www.ics.uci.edu/~wscacchi/SA/Readings/P2P-Computer-Whinston-July01.pdf.*

*Primary Examiner* — Justin M Pats
*Assistant Examiner* — Uche Byrd
(74) *Attorney, Agent, or Firm* — Wells St. John P.S.

(57) ABSTRACT

A method is provided of anonymizing an interaction between a user entity and a service provider node wishing to provide a service to the user entity in dependence upon characteristics of the user entity determined or revealed as a result of the interaction, the method comprising: assigning the user entity to at least one set, each set comprising as members a plurality of user entities sharing a characteristic associated with that set; ensuring that the intersection of the at least one set comprises at least a predetermined minimum number of user entities; and providing to the service provider node information relating to the or each characteristic associated with the at least one set, the information being for use at the service provider node in providing a service to the user entity that is appropriate in view of the characteristics of the user entity but insufficient to identify the user entity.

33 Claims, 1 Drawing Sheet

(56) References Cited

U.S. PATENT DOCUMENTS

| | | | |
|---|---|---|---|
| 8,060,914 B2 * | 11/2011 | Zeng ................................ | 726/2 |
| 8,296,162 B1 * | 10/2012 | Horn et al. ....................... | 705/2 |
| 2002/0099824 A1 | 7/2002 | Lloyd et al. | |
| 2004/0078475 A1 * | 4/2004 | Camenisch et al. .......... | 709/229 |
| 2004/0102182 A1 * | 5/2004 | Reith et al. ................... | 455/410 |
| 2004/0181683 A1 | 9/2004 | Jia | |
| 2007/0106892 A1 * | 5/2007 | Engberg ....................... | 713/168 |
| 2010/0312706 A1 * | 12/2010 | Combet et al. ................ | 705/50 |

FOREIGN PATENT DOCUMENTS

| | | |
|---|---|---|
| WO | WO 01/65442 A1 | 9/2001 |
| WO | WO 02/35314 A2 | 5/2002 |
| WO | WO 02/49311 A2 | 6/2002 |
| WO | PCT/GB2008/051132 | 7/2009 |

* cited by examiner

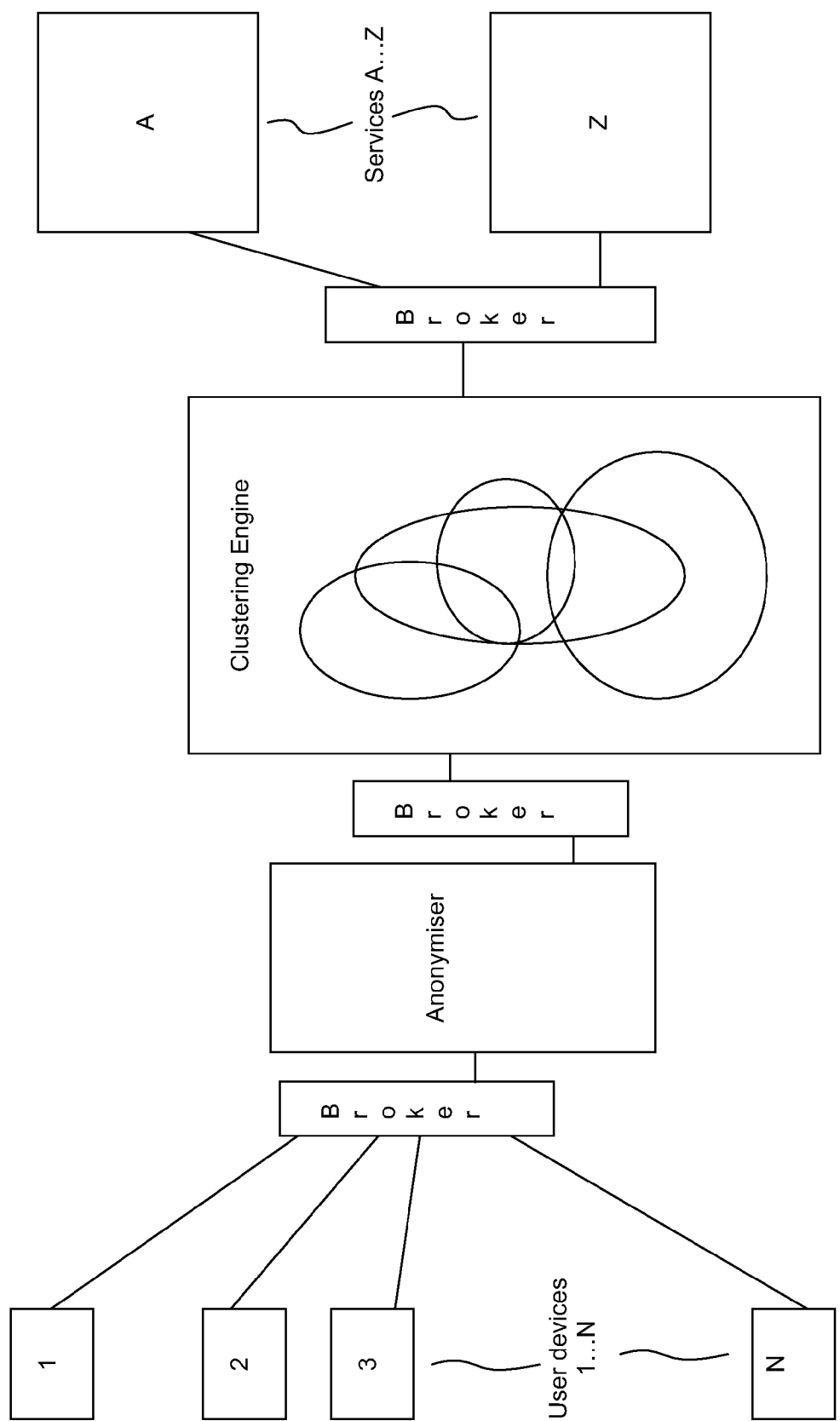

METHOD OF ANONYMISING AN INTERACTION BETWEEN DEVICES

CROSS REFERENCE TO RELATED APPLICATION

This application is a 35 U.S.C. §371 of and claims priority to PCT International Application Number PCT/GB2008/051132 (Publication No. WO 2009/068917A2), which was filed 28 Nov. 2008, and was published in English, and this application claims priority to GB Patent Application No. 0723276.2 which was filed 28 Nov. 2007, and the teachings of which are incorporated herein by reference.

TECHNICAL FIELD

The present invention relates to a method of anonymising an interaction between devices.

BACKGROUND

Interactive systems, whether for humans or machines, typified by the example of the internet, but also more generally for any interactive system linking people and machines, for example mobile telephone services, provide a level of personalisation by observing and recording the behaviour of an individual. Sometimes this is done by lodging in a central database, or in a hierarchy of multiple databases, data that has been observed on behaviour and preferences of users.

A typical system might log the IP address of a user machine or application, and recognise that real (or virtual) "user" on return. More sophisticated systems might leave a portion of the activity database, for example the piece of code often referred to as a "cookie", on the user's machine, or lodged in some interim database or databases between the user application and the ultimate host for that application, or in some interim relay application.

In this way the ultimate host application or applications and databases associated with it, records information on behaviour and preferences in between visits to the host machine, service or application. The user is therefore identifiable and identified specifically.

The user, whether human or machine, of services provided across the network accepts, typically by default but sometimes explicitly, to be identified in order to be offered tailored information, including the offer of possible transactions which then require the further provision of specifically personal data such as credit card information.

Sometimes, for example when accessed from a company or a specific Internet Service Provider (ISP) there is an accidental level of anonymity provided for the end user. For example, the host sees only that the user has arrived from AOL® or from within IBM®, but increasingly systems serving content look beyond this to identify the user machine or user specific application to the host application.

In the case of mobile phones, specific identification of the handset is required to enable the call to take place (and in future this will extend to the application running in the handset). Often the user is asked for further information to be volunteered and this allows greater tailoring in exchange for less privacy.

Anonymous web access is possible using a proxy server or anonymiser service but then there is no possibility for the provision of tailored services to that real or virtual "user". These services may be the provision of content for humans, or may be privileged computing and bandwidth services or perhaps tailored information services or access rights or commercial offers including direct marketing or advertising offers, or other types of data or media content.

If the user uses an existing proxy machine or an existing anonymiser service they can be anonymous but they then forgo any systematic chance of a tailored or personalised response from the service or machine or application. This may be as simple as forgoing preferential access speeds or as complex as being unable to access specific as personalised and private information unique to the user.

It is desirable to address this problem.

SUMMARY

According to a first aspect of the present invention there is provided a method of anonymising an interaction between a user entity and a service provider node wishing to provide a service to the user entity in dependence upon characteristics of the user entity determined or revealed as a result of the interaction, the method comprising: assigning the user entity to at least one set, each set comprising as members a plurality of user entities sharing a characteristic associated with that set; ensuring that the intersection of the at least one set comprises at least a predetermined minimum number of user entities; and providing to the service provider node information relating to the or each characteristic associated with the at least one set, the information being for use at the service provider node in providing a service to the user entity that is appropriate in view of the characteristics of the user entity but insufficient to identify the user entity.

The method may comprise populating at least one set with dummy user entities to ensure that the intersection comprises at least the predetermined minimum number of user entities.

The method may comprise presenting a warning at the user entity if the intersection comprises a number of user entities within a predetermined range.

An information broker node may communicate with a clustering engine node to determine the at least one set to be assigned to the user entity, with the clustering engine node having knowledge of membership of the sets and the information broker node providing to the clustering engine node information sufficient to assign the user entity to the at least one set.

The clustering engine node may act on abstractions of identities the translation of which to real identities is not known by the clustering engine node.

The information broker node may maintain information sufficient to identify the user entity without retaining knowledge of the characteristics of the user entity.

The information broker node may be distributed across a plurality of nodes.

The method may comprise maintaining a record of user entity membership for each set, and updating the membership of the at least one set when the user entity is assigned to the at least one set.

At least some of the steps may be performed at a node, or a cooperation of nodes, disposed on a communication path between the user entity and the service provider node.

The service may be provided to the user entity via the node or cooperation of nodes.

The method may comprise, on request of the user entity, allowing the user entity to be identified to another user entity in the at least one set.

The method may comprise, on request of the user entity, allowing the user entity to be identified to the service provider node.

The method may comprise providing a service to the user entity in dependence upon the information.

The service may comprise sending data to the user entity.

The data may comprise media content.

The data may comprise advertising content.

The predetermined minimum number may be at least two, at least three, at least ten, or at least 100.

The method may comprise determining the predetermined number dynamically during use, so that the predetermined number need not be fixed.

The user entity may comprise a device.

The characteristics may comprise at least one of the hardware capabilities of the device, software capabilities of the device, and location of the device.

The user entity may comprise a user of the device.

The user entity may comprise a user of a device.

The characteristics may comprise personal information relating to the user, such as an indication of at least one of the age, gender, home address, postcode, salary, likes, and dislikes of the user.

According to a first aspect of the present invention there is provided an apparatus for anonymising an interaction between a user entity and a service provider node wishing to provide a service to the user entity in dependence upon characteristics of the user entity determined or revealed as a result of the interaction, the apparatus comprising: means for assigning the user entity to at least one set, each set comprising as members a plurality of user entities sharing a characteristic associated with that set; means for ensuring that the intersection of the at least one set comprises at least a predetermined minimum number of user entities; and means for providing to the service provider node information relating to the or each characteristic associated with the at least one set, the information being for use at the service provider node in providing a service to the user entity that is appropriate in view of the characteristics of the user entity but insufficient to identify the user entity.

According to a third aspect of the present invention there is provided a program for controlling an apparatus to perform a method according to the first aspect of the present invention, or which when loaded into an apparatus causes the apparatus to become apparatus according to the second aspect of the present invention.

The program may be carried on a carrier medium.

The carrier medium may be a storage medium or it may be a transmission medium.

According to a fourth aspect of the present invention there is provided an apparatus programmed by a program according to the third aspect of the present invention.

According to a fifth aspect of the present invention there is provided a storage medium containing a program according to the third aspect of the present invention.

Methods processes and mechanisms are provided to enable users of interactive computer and communication systems to achieve the benefits of personalisation without the problem of revealing their identity to other humans or to intermediate machines by the provision of one or more 'anonymiser' devices and applications working in conjunction with one or more 'grouping engines' and working with an information broker which is independent of both the anonymiser and the clustering function.

The use of these three logical components in combination and the methods and processes employed in their deployment are novel and in their implementation provide a technical benefit from a computing and communication perspective.

BRIEF DESCRIPTION OF THE DRAWINGS

FIG. 1 is a schematic illustration of an embodiment of the present invention.

As mentioned previously, if a user uses a proxy machine or an anonymiser service they can be anonymous but they then forgo any chance of a tailored or personalised response from the service or machine or application.

In order to obtain the benefits of personalisation without the potential for intrusion, an independent information brokerage service allied to the anonymiser is provided in an embodiment of the present invention. This service enables the user to deal only with it, the broker, alone and it deals uniquely on behalf of the user with any request for or provision of information.

DETAILED DESCRIPTION

The information broker is in a privileged position of trust with both the user and the host application and/or service, and the agreement of both to trust the broker is required.

Once the broker has been identified as trusted by the host and the user has volunteered to use it and therefore agreed to trust it, it is proposed in a method embodying the present invention that the user is never individually identified to the host machine or application. The user is only ever identified as part of a group of similar or like individuals.

Similar or "like" users are grouped by the grouping engine, whereby each group is never less than, say, three to ensure anonymity, but may be more than, say, three where required.

The user may be offered the chance to choose the level of grouping: for example never less than two, three, 30, or 300, depending on the level of personalisation required and the level of obfuscation of their identity required for that application. This level need not be fixed but may be determined dynamically during use.

The group management processes use set theory and advanced clustering information technology and mechanisms to ensure that adequate numbers are in the group to ensure continued privacy. This is likely to be dynamic and interactive with the user, who would be warned when they are in danger of stepping out of that 'crowd', though the user can chose to do so if they wish (unless they have signed up not to be allowed that right—for example for parental control over their children's activity on-line). The individual user identity is therefore "lost in a crowd" of other users. The size of the crowd may be variable depending on the application. Group membership of the user may change and be, in effect, a series of mappings or pseudo or temporary groups imposed for a transaction or transaction for a period of time.

The users in each group may remain anonymous to each other or may choose to be identified to each other for some purposes but not others. For example they may wish to buy a concert ticket. They may be in a group of ten from Putney attending a concert in Reading. They may choose to allow other group members to message them to arrange a rideshare.

In order to comply with information access laws and to provide an audit trail the full details of group membership are maintained in the information broker but are only ever accessible to an external independent audit firm. The clustering engine and the broker are separate processes and abstracted information from the clustering engine may be used by the broker and vice versa but they never exchange enough information to allow the role of independent broker to be compromised.

An analogue of this system, which is dynamic in principle but which changes only rarely because it is based on physical buildings and households, is the Zip code or Post Code system. This system groups people by residential or commercial geographic location.

A zip code represents a group of people who have potentially no other group affiliation other than location. But they may be in that location because of schools and therefore share other characteristics like children of school age. They may be involved in activities involving for example the sea, or the mountains, depending on the location. Their behaviours may map them to hundreds of groups and only the recoding of all and the comparison of all with others may distinguish them as an individual. That is to say if a Venn diagram were drawn of all characteristics of that individual and his neighbours eventually the overlapping area would identify the individual. In some cases, and for some characteristics, although they may think of themselves as quite unique in their likes and behaviours in fact they may be like many hundreds of similar people.

In order to benefit from special directed messages or privileges it may not be necessary to take the path taken by on-line technology today: they may have the option without compromising the benefits they receive to remain lost in a crown of thousands and have no need give up their identity to receive those benefits; mortgage offers to Fulham (London, England) residents for amounts greater than £1 M, for example. Once the offer has been targeted, the user may then decide to enter into a transaction, during the course of which they may choose to reveal their specific identity. But they know to whom they have provided that information.

The population associated with each zip code and post code would never usually be fewer than a predetermined level to ensure anonymity. The analogy is not perfect but serves to illustrate the concept.

The anonymiser service exists for human activity on the Web at least. What is novel in an embodiment of the present invention is to extend this concept to machine interactions in a network and to mobile networks for humans, as is the manner in which an interaction is actually anonymised.

Versions of clustering engines exist to cluster known identities and their characteristics, but not in the context of anonymising interactions and communications between devices. A version to retain the identity within an ID brokerage context is novel. A user may be alone in a cluster group but their identity as the sole occupant is never known to the service. Clusters may be 'pre-prepared' with dummy members before adding real users who are observed to exhibit a characteristic to ensure that there is more than one member to a cluster, or dummy members may be added during use as required. The clustering is done on abstractions of identities the translation of which to real identities is not known to the clustering engine or its operators, human or machine. Clustering can be in real time or batched into runs.

The following example is provided by way of further explanation. Consider an individual who lives in Putney (London, England), has had an interest in double glazing, an interest in dogs, and an interest in Mercedes cars. This makes the individual a member of a set of individuals and no further knowledge is needed to advertise to them a wide range of products. That they also have an interest in crèches and rugby, Bach and Tuscany may still not be enough to allow insight into the individual. Add to this an interest in childhood eczema and it might identify just one family. Widen the clustering to include neighbouring Wandsworth, and the 'crowd' is restored and hence privacy also. Dummy members of the group(s) can be added to ensure there is no chance that individual IDs are compromised. The 'services' never learn the identities of the users (human or machine).

Versions of information brokers exist but typically the broker retains the knowledge of the relevant characteristics of the individuals.

The brokerage function can be distributed throughout the network to enable fast response times.

Potential applications of an embodiment of the present invention include, but are not limited to:

1. A user is a person who wants to retain privacy and not be able to be identified but wants relevant advertising from a server(s) tasked with delivering relevant messages. Instead of interacting with the content company directly and experiencing ads served by in-house or outsourced ad servers the user logs onto the new service and is guaranteed anonymity. He stills sees adverts but these are served to the 'cluster' or like users.

2. A user is a machine/application that wants resources from another machine/application. The application could be a mobile phone. The mapping or mobile number to device number or identity to a specific stream is never revealed to the service infrastructure.

3. A user is a device consuming a service provided by a remote WiFi wireless access point, with at least partial anonymity being provided for the access point. In this example anonymity is working in the opposite direction to above examples, with the service provider node being anonymised during an interaction with a user entity.

4. Applications of the processes and techniques described will include the certainty of obfuscation of individual identity of persons or processes where there is a legal requirement for protection of identity. Medical records is one such example. Doctors treat individuals but the diagnosis is made with respect to combinations of factors which are usually not unique. A patient may present with extreme stomach ache, no history of pain, but having been on a sea cruiseliner. His experience is individual and his full records are private but the diagnosis focuses on the common experience of his fellow travelers in contracting a virus. Other applications include manipulating patient records to 'mine' data for various purposes. The techniques ensure protection of an individual by policing the group size to ensure it is greater than a desired number.

5. Groups of characteristics sufficiently useful to allow commercial exploitation for targeting of advertising and direct marketing or other commercial activities may include general location information, country or county or town. As mobile networks begin to use higher bandwidth smaller sized 'cells' the potential exists for these groupings to infringe individual privacy when location is added as a characteristic. Many people content to be potentially anonymous in a large group of online users worry more about being able to be isolated by targeting techniques when using mobile devices. The mobile networks layer information collection and delivery protocols on top of the 'circuit switched' networks required to establish voice call connections. These information services and providers and users of them are likely to draw comfort from the policed and enforced anonymity provided by the processes described. For example, instead of being the only person on a street in London to be a member of a dynamically assembled group as described, the software will include, dynamically, other neighbouring streets restoring privacy.

6. Brands like Volvo® or Coca Cola® may find that certain groups of characteristics are those which are associated closely with their own product propositions. They may wish to offer groups to which users can 'connect' by use of shared or communal cookies or other techniques. The process and techniques allow this to happen and yet to protect individual identity amongst their user base. By examination of the characteristics within the user base so attracted they may be able to further refine their product proposal without product surveys.

7. Voting or expressions of collective opinion can be facilitated where the joining of a group (qua expression of a preference) is formally hidden from the revelation of an individuals identity, albeit that mechanisms can prevent multiple votes or expressions by the same identity.

It is envisaged that in some jurisdictions access must be provided to enable the ID to be revealed. Under controlled conditions, authorised users can be given access to the underlying IDs; however this would never be for commercial purposes, only for law enforcement.

A schematic illustration of a system embodying the present invention is provided in FIG. 1. Applications running on multiple user devices 1 to N, each potentially running one or more applications, can dialogue with the anonymiser via an information broker and call for services A to Z, which may provide content and/or services to the end user applications, but the anonymiser alone dialogues with the clustering engine via another information broker without revealing the identity of the user(s), the application(s) or the device(s). The clustering engine starts a new dimension to cluster future instances around (for example a new location or a new content type) either in advance of demand by users (human or not) or adds the instance to an existing cluster or clusters. The clusters then act as if they were themselves the initiating user (human or machine) in calling for one or more of the services A to Z. Note that the services may reside on the user devices (p2p applications) and the anonymiser and clustering engine can be hosted on one device or several and their function can be distributed throughout the network on user devices or 'servers' as required to make the network efficient It will be appreciated by the person of skill in the art that various modifications may be made to the above-described embodiments without departing from the scope of the present invention as defined by the appended claims. For example, at least one of the information brokers shown in FIG. 1 can be omitted for certain applications; the information broker between the anonymiser and the clustering engine may be omitted for example. The information broker in FIG. 1 between the user devices and the anonymiser can be allowed to choose a suitable anonymiser from a plurality of available anonymisers, and the information broker between the anonymiser and the clustering engine can be allowed to choose a suitable clustering engine from a plurality of available clustering engines.

WO 02/035314 mentions clustering into anonymous groupings, with the apparent purpose of protecting the user's identity or to "prevent triangulation", such that a third party "cannot determine, or triangulate, a unique individual from this data". However, this is actually a very different approach to that according to an embodiment of the present invention. WO 02/035314 does not explicitly count the numbers of people or entities within each grouping, or explicitly count the number in the intersection of those groupings, unlike an embodiment of the present invention. Instead, it appears that WO 02/035314 teaches merely that each piece of information is broadened to such an extent that the "hope" is that the individual can no longer be identified. There is no suggestion that a procedure is adopted according to an embodiment of the present invention to control the population or membership of the various groupings or sets to ensure a minimum number is present in an intersection between the various groupings or sets. It is quite apparent that this information (exact numbers) would not actually be readily available for the examples provided in WO 02/035314 (e.g. the number of foreigners in the US, or the population of the NE of the US, or the number of families with more than one child). There is no teaching in WO 02/035314 as to how triangulation is actually prevented. According to an embodiment of the present invention the numbers are counted precisely to ensure that there is never exactly one (or less than a predetermined low number, which may be two or may be higher) in the intersection—and in one embodiment even populating at least one set with dummy user entities to ensure that the intersection comprises at least the predetermined minimum number of user entities.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A method of anonymising an interaction between a user entity comprising a computing device and a service provider node wishing to provide a service via a network to the user entity in dependence upon characteristics of the user entity determined or revealed as a result of the interaction, the method comprising: assigning the user entity to a plurality of sets, each set of the plurality of sets comprising as members a plurality of user entities sharing a characteristic associated with that set; ensuring that an intersection of the plurality of sets comprises at least a predetermined minimum number of user entities, wherein the predetermined minimum number of user entities is at least three; and providing to the service provider node, as part of the interaction, information relating to the characteristic associated with each set of the plurality of sets, the information being for use at the service provider node in providing the service to the user entity, as part of the interaction, that is appropriate in view of the characteristics of the user entity but insufficient to identify the user entity, wherein the assigning, ensuring and providing steps are performed at an anonymiser disposed on a communication path between the user entity computing device and the service provider node, the anonymiser comprising a node or a cooperation of nodes, wherein anonymised service is provided to the user entity via the anonymiser as part of the interaction between the user entity and the service provider; communicating, via an information broker node, with a clustering engine node to determine the plurality of sets to be assigned to the user entity, with the clustering engine node having knowledge of membership of the sets and the information broker node providing to the clustering engine node information sufficient to assign the user entity to the plurality of sets; and wherein the clustering engine node acts on abstractions of identities the translation of which to real identities is not known by the clustering engine node.

2. A method as claimed in claim 1, comprising populating at least one of the sets with dummy user entities to ensure that the intersection of the sets comprises at least the predetermined minimum number of user entities.

3. A method as claimed in claim 1,
comprising presenting a warning at the user entity computing device if the intersection of the sets comprises a number of user entities within a predetermined range.

4. A method as claimed in claim 1, wherein the information broker node maintains information sufficient to identify the user entity without retaining knowledge of the characteristics of the user entity.

5. A method as claimed in claim 1, wherein the information broker node is distributed across a plurality of nodes.

6. A method as claimed in claim 1, comprising maintaining a record of user entity membership for each set, and updating the membership of the plurality of sets when the user entity is assigned to the plurality of sets.

7. A method as claimed in claim 1, comprising, on request of the user entity, allowing the user entity to be identified to another user entity in the plurality of sets.

8. A method as claimed in claim 1, comprising, on request of the user entity, allowing the user entity to be identified to the service provider node.

9. A method as claimed in claim 1, wherein the anonymised service is provided to the user entity in dependence upon the information.

10. A method as claimed in claim 1, wherein the anonymised service comprises sending data to the user entity.

11. A method as claimed in claim 10, wherein the data comprise media content.

12. A method as claimed in claim 10, wherein the data comprise advertising content.

13. A method as claimed in claim 1, wherein the predetermined minimum number is at least ten.

14. A method as claimed in claim 1, wherein the predetermined minimum number is at least 100.

15. A method as claimed in claim 1, comprising determining the predetermined number dynamically.

16. A method as claimed in claim 1, wherein the characteristics comprise at least one of the hardware capabilities of the device, software capabilities of the device, and location of the device.

17. A method as claimed in claim 1, wherein the user entity comprises a user of the device.

18. A method as claimed in claim 1, wherein the user entity comprises a user of a device.

19. A method as claimed in claim 17, wherein the characteristics comprise personal information relating to the user, such as an indication of at least one of the age, gender, home address, postcode, salary, likes, and dislikes of the user.

20. A method as claimed in claim 18, wherein the characteristics comprise personal information relating to the user, such as an indication of at least one of the age, gender, home address, postcode, salary, likes, and dislikes of the user.

21. A method according to claim 1, comprising determining the predetermined number dynamically and interactively with the user entity.

22. A method as claimed in claim 1, wherein the size of at least one of the sets to which a user belongs is variable.

23. A method as claimed in claim 1, comprising providing, to an authorised user and under controlled conditions, access to the identity of a user of the device.

24. An apparatus for anonymising an interaction between a user entity comprising a computing device and a service provider node wishing to provide a service via a network to the user entity in dependence upon characteristics of the user entity determined or revealed as a result of the interaction, the apparatus comprising: an anonymiser device configured to assign the user entity to a plurality of sets, each set of the plurality of sets comprising as members a plurality of user entities sharing a characteristic associated with that set; the anonymiser device is configured to ensure that an intersection of the plurality of sets comprises at least a predetermined minimum number of user entities, wherein the predetermined minimum number of user entities is at least three; and the anonymiser device is configured to provide to the service provider node, as part of the interaction, information relating to the characteristic associated with each set of the plurality of sets, the information being for use at the service provider node in providing the service to the user entity as part of the interaction, that is appropriate in view of the characteristics of the user entity but insufficient to identify the user entity, wherein the anonymiser device is disposed on a communication path between the user entity and the service provider node, wherein anonymised service is provided to the user entity via the anonymiser device as part of the interaction between the user entity and the service provider; an information broker node communicates with a clustering engine node to determine the plurality of sets to be assigned to the user entity, with the clustering engine node having knowledge of membership of the sets and the information broker node providing to the clustering engine node information sufficient to assign the user entity to the plurality of sets; and wherein the clustering engine node acts on abstractions of identities the translation of which to real identities is not known by the clustering engine node.

25. An article of manufacture comprising: non-transitory storage media comprising programming which causes processing circuitry to perform a method of anonymising an interaction between a user entity comprising a computing device and a service provider node wishing to provide a service via a network to the user entity in dependence upon characteristics of the user entity determined or revealed as a result of the interaction, the method comprising: assigning the user entity to a plurality of sets, each set of the plurality of sets comprising as members a plurality of user entities sharing a characteristic associated with that set; ensuring that an intersection of the plurality of sets comprises at least a predetermined minimum number of user entities, wherein the predetermined minimum number of user entities is at least three; and providing to the service provider node, as part of the interaction, information relating to the characteristic associated with each set of the plurality of sets, the information being for use at the service provider node in providing the service to the user entity, as part of the interaction, that is appropriate in view of the characteristics of the user entity but insufficient to identify the user entity, wherein the assigning, ensuring and providing steps are performed at an anonymiser disposed on a communication path between the user entity computing device and the service provider node, the anonymiser comprising a node or a cooperation of nodes, wherein anonymised service is provided to the user entity via the anonymiser as part of the interaction between the user entity and the service provider; communicating, via an information broker node, with a clustering engine node to determine the plurality of sets to be assigned to the user entity, with the clustering engine node having knowledge of membership of the sets and the information broker node providing to the clustering engine node information sufficient to assign the user entity to the plurality of sets; and wherein the clustering engine node acts on abstractions of identities the translation of which to real identities is not known by the clustering engine node.

26. The article as claimed in claim 25, comprising populating at least one of the sets with dummy user entities to ensure that the intersection of the sets comprises at least the predetermined minimum number of user entities.

27. The article as claimed in claim 25, comprising presenting a warning at the user entity computing device if the intersection of the sets comprises a number of user entities within a predetermined range.

28. The article as claimed in claim 25, wherein the information broker node maintains information sufficient to identify the user entity without retaining knowledge of the characteristics of the user entity.

29. The article as claimed in claim 25, wherein the information broker node is distributed across a plurality of nodes.

30. The article as claimed in claim 25, comprising maintaining a record of user entity membership for each set, and updating the membership of the plurality of sets when the user entity is assigned to the plurality of sets.

31. The article as claimed in claim 25, comprising, on request of the user entity, allowing the user entity to be identified to another user entity in the plurality of sets.

32. The article as claimed in claim 25, comprising, on request of the user entity, allowing the user entity to be identified to the service provider node.

33. The article as claimed in claim 25, wherein the anonymised service is provided to the user entity in dependence upon the information.

* * * * *